United States Patent Office 2,998,152
Patented Aug. 29, 1961

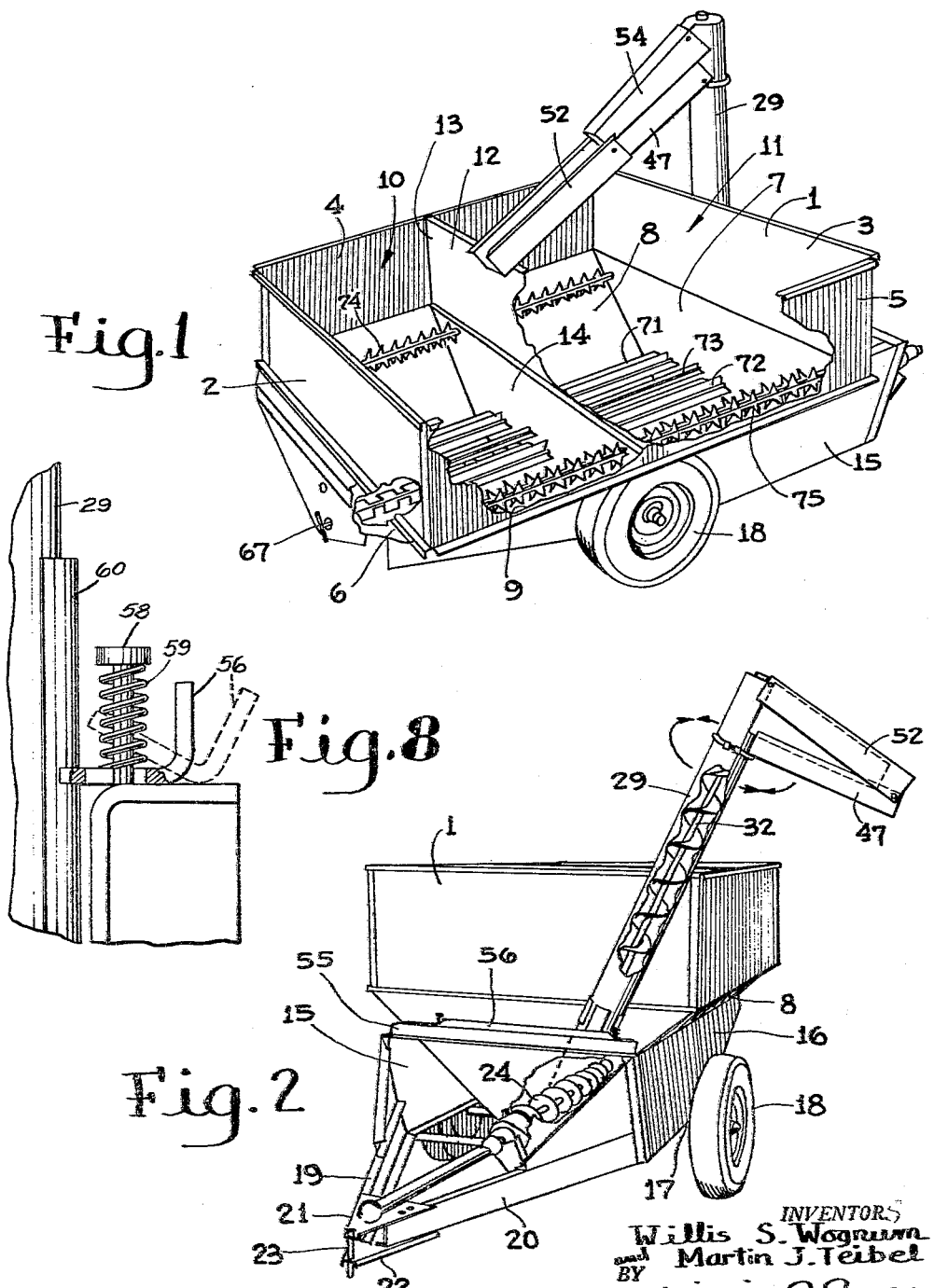

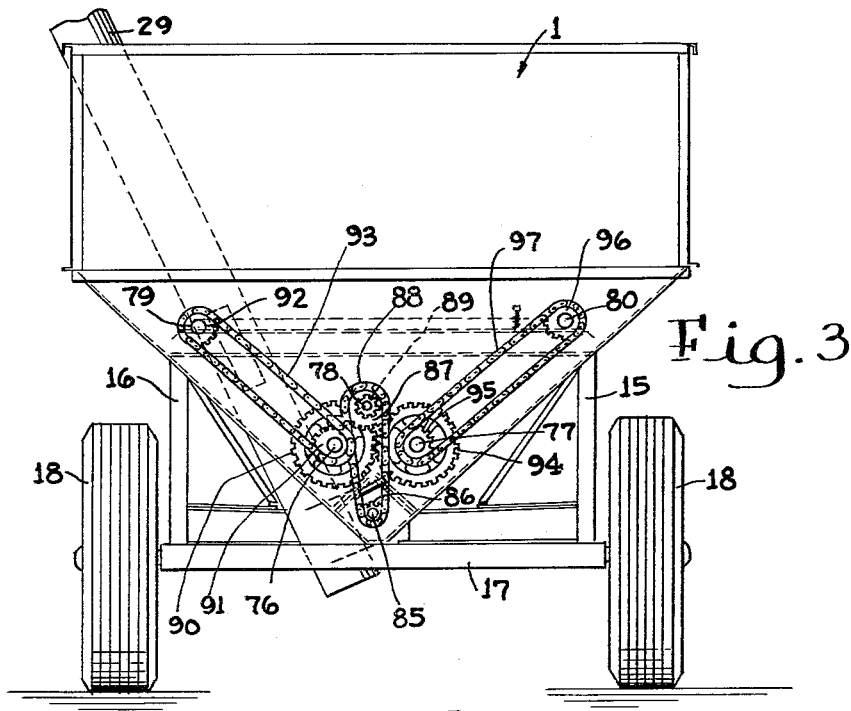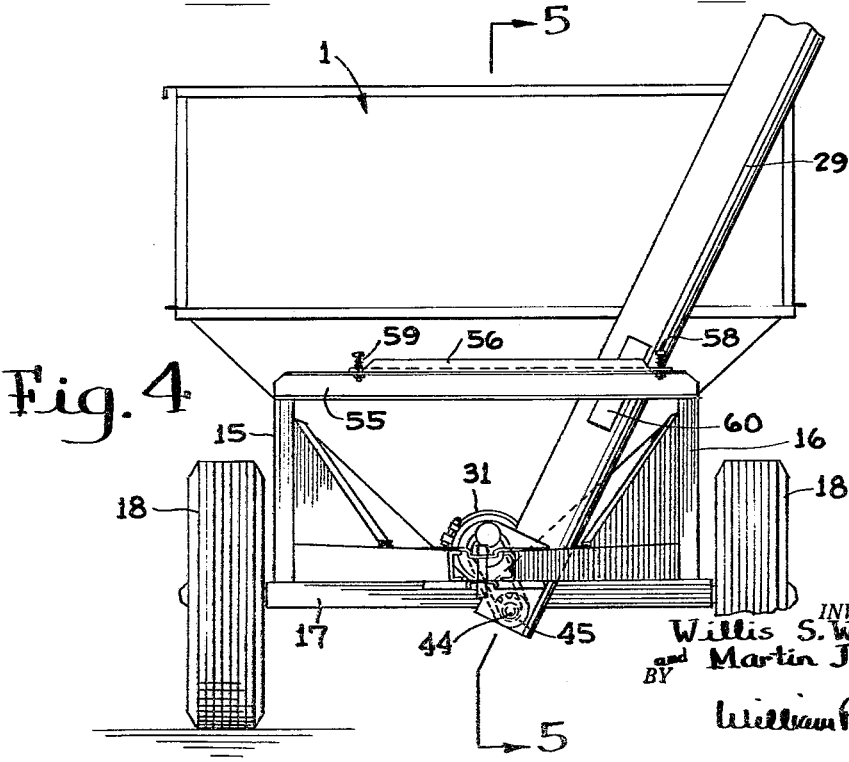

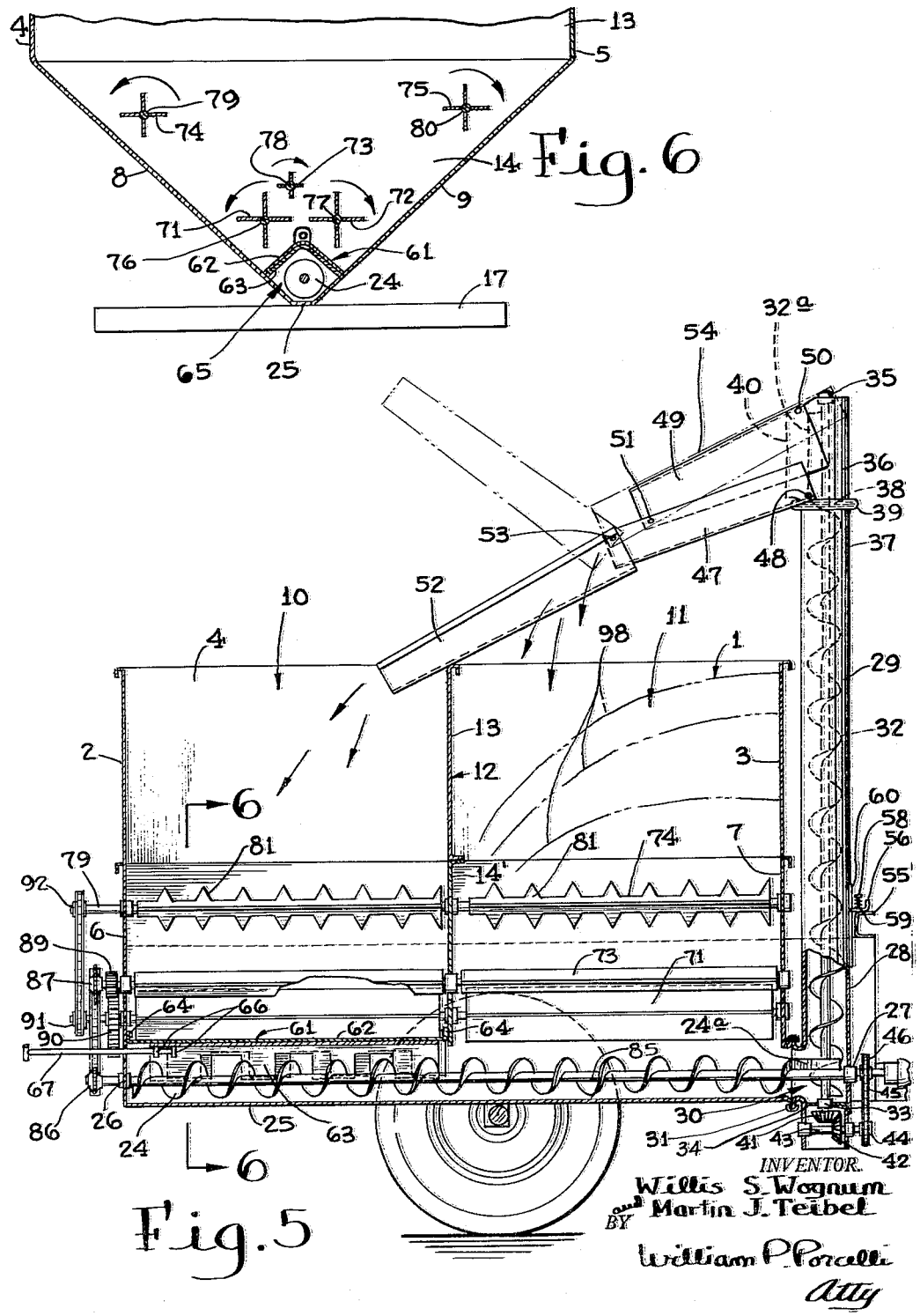

2,998,152
MOBILE AUGER BOX FOR MIXING, BLENDING AND DISTRIBUTING GRANULAR MATERIAL
Willis S. Wognum and Martin J. Teibel, Crown Point, Ind., assignors to Helix Corporation, Crown Point, Ind., a corporation of Indiana
Filed May 20, 1957, Ser. No. 660,396
4 Claims. (Cl. 214—522)

This invention relates to improvements in auger boxes of a type commonly associated with farm machinery and equipment and adapted for transporting and distributing fertilizers, or the like, and grain feeds for animals and poultry.

The usual auger box is provided with a horizontal auger rotating at the bottom of a trough shaped box for feeding materials such as grain or fertilizer to a vertical auger contained in a tube at one end of the auger box. The vertical auger directs the grain or material upward to a spout which is directed to feed the material in whichever direction is required. The box is supported on wheels to provide it with mobility so that it can be pulled by a tractor or other vehicle to a particular location or along a path for unloading. Primarily, this type of an auger box provides a means for distributing the grain or the material and means for providing a coarse mixing of the material being distributed. The mixing is accomplished by placing layers of different grains or materials one upon the other in the auger box. Since the horizontal auger fills up from one end as it carries the grain toward its other end, the layered material in the box soon is provided with a rearward slope where portions of the materials from all of the layers flow down the slope and into the auger simultaneously at the one end of the box. With this type of single compartment auger box, there is no means provided for re-mixing the material by re-circulation back into the auger box to produce a uniform blend. It merely provides a means for comparatively coarse mixing as the material is distributed. When the material must be mixed thoroughly or blended, the only means available is a vertical stationary mixer separate from the auger box. It has a disadvantage that it is not adapted for mobility to the place where the material is distributed; rather, the material is mixed at the location of the mixer and then dumped into an auger box for distribution.

It is the principal object of this invention to provide an improved auger box having all of the advantages of the ordinary auger box and which can also be used for thorough mixing and blending of grain, supplements or fertilizer materials as well as for conveniently mixing together proportionate amounts of different grains, supplements or fertilizers, or the like.

In order to achieve this object, it is another object to provide an auger box having at least two compartments into which the material to be mixed, blended and distributed can be loaded, at least one of the compartments being provided with a valve for regulating the flow of grain or material from one of the compartments to the horizontal auger. The valve is preferably of a type which can be regulated to provide flow of the material by varying amounts.

It is another object of this invention to provide an auger box embodying its own mixer apparatus which permits a thorough mixing and blending of the material to preclude the necessity of mixing in a separate mixer removed from the location of the auger box or from where the material is distributed.

It is still another object of this invention to provide an improved auger box having the mixing and blending advantages mentioned which is extremely economical to manufacture.

The invention can be better understood by referring to the accompanying drawings in which:

FIG. 1 shows a partially cutaway perspective view of a preferred embodiment of an auger box made according to this invention;

FIG. 2 shows another partially cutaway perspective view of the auger box shown in FIG. 1, except that the view is substantially from its other end;

FIG. 3 shows a rear view of the auger box shown in FIGS. 1 and 2;

FIG. 4 shows a front end view of the same auger box;

FIG. 5 shows a sectional view of the auger box taken along the line 5—5 of FIG. 4;

FIG. 6 shows a partial sectional view taken along the line 6—6 of FIG. 5;

FIG. 8 shows an enlarged partial cutaway view of a right hand portion of Fig. 5.

Figure 7:
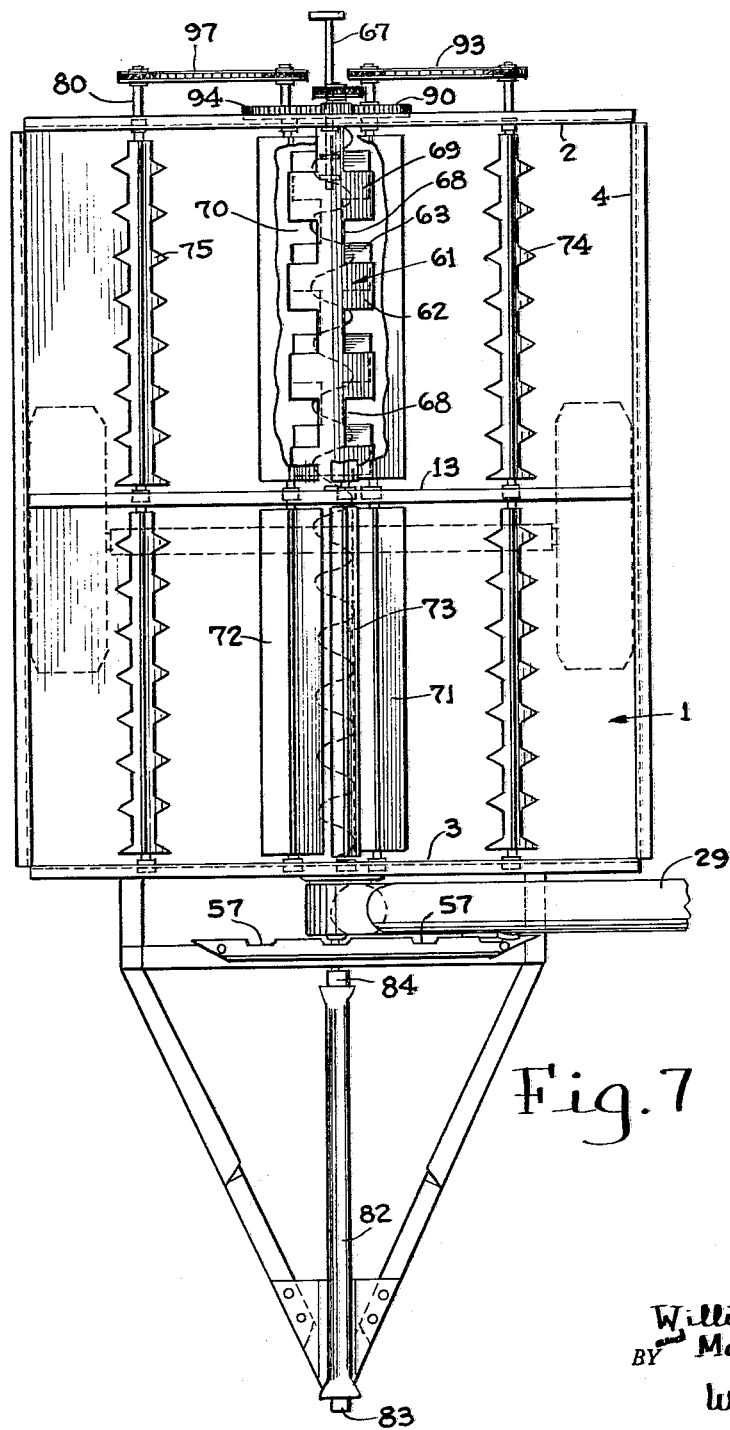
FIG. 7 shows a top plan view of the auger box.

As shown in FIGS. 1 and 2, a preferred embodiment of the invention consists of a receptacle 1 provided with two end walls 2 and 3 and two side walls 4 and 5 connected together in the form of a rectangular frame. These four walls are connected at their bottom edges to two triangular shaped end walls 6 and 7 and two inwardly sloping side walls 8 and 9. The ends of these four walls 6, 7, 8, and 9 are joined together to provide a V-shaped trough below the level of the rectangular frame composed of the walls 2, 3, 4, and 5. This entire receptacle 1 is divided into two compartments 10 and 11 by means of a wall 12 across its midportion. The wall 12 consists of a wall 13 of the same size and shape as walls 2 and 3. The wall 13 is positioned above the vertical wall 14 which is of the same size and shape as the triangular end walls 6 and 7. The result is that the two compartments 10 and 11 are similar to each other in both size and shape. The receptacle 1 is supported upon two upright longitudinally extending frame supports 15 and 16 mounted for support on an axle 17 which, in turn, is supported by two wheels 18, one at either of its ends. These wheels 18 are freely rotatable on the axle 17 so that the auger box can be transported about as required. Extending forwardly of these frame members 15 and 16 are two channel shaped frame members 19 and 20 which converge to a region where their ends are connected together by means of two triangular shaped gusset plates, 21 and 22. These gusset plates are each provided with a hole through which a pin 23 is passed and which enables the auger box to be connected to the rear end of a vehicle, such as a tractor, used for pulling the auger box as a trailer.

As best shown in FIGS. 2 and 5, the lower portion of the receptacle 1 is provided with a horizontal auger 24 which is positioned in the region where the inclined side walls 8 and 9 converge and connect to a narrow bottom wall 25 of the receptacle 1. The auger is journaled at its rear end in a bearing 26 mounted in the end wall 6. Its forward end is mounted in a bearing 27 which is mounted in the wall 28 of an upwardly extending auger tube 29. The auger tube 29 is provided with an opening 30 having a circular flange abutting a circular flange on the wall 7 of the receptacle. The annular flanges are held together by means of a retaining ring 31 which, not only keeps the flanges abutting, but allows their relative rotation.

The auger tube 29 is provided with an internally positioned auger 32 which is journaled at its lower end in a bearing 33 contained in a wall 34 within the lower portion of the auger tube 39. The upper end of the auger is journaled in a bearing 35 at the upper end of the auger tube 29. The auger tube 29 is divided into two lengths 36 and 37. Each of these lengths are provided with abutting flanges at 38 which are held together by means of a retaining ring 39. The retaining ring 39 holds these lengths 36 and 37 together and it also permits the rotation of the length 36 relative to length 37. In the region of these flanges, the length 36 is provided with an opening 40 through which the grain can be expelled. The extreme lower end of the auger 32 is provided with a bevel gear 41 which engages another bevel gear 42 journaled at the base of the auger tube on a shaft 43. The outer end of this shaft is provided with a pinion 44 driven by means of a chain 45 from a sprocket 46 mounted on the end of the horizontal auger 24. With this arrangement, rotation of the horizontal auger 24 causes rotation of the vertical auger 32 as motion is transmitted through the sprockets, the chain and the bevel gears.

At the upper end of the auger tube 29 the length 36 having the opening 40 is provided with a channel 47 which is mounted to the length 36 by means of a pin 48. The length 36 is also provided with an inverted channel 49 mounted to the length 36 by means of a pin 50. Positioning of the channels 47 and 49 in a particular angular relationship relative to each other is determined by means of a pin 51 connecting them together adjacent their outer ends. With these channels 47 and 49 positioned in this manner, a rectangular opening is then provided through which grain can pass and be guided as it is expelled through the opening 40. Still another channel member 52 is provided on a pivot pin 53 which fastens it to the outer end of the channel 47 when this channel member 52 is in a position as shown in bold outline in FIG. 5. It acts as an extension for the channel 47 which permits the grain or material to be passed from the vertical auger 32 into the compartment 10 of the auger box. If it is desired to have the material flow into the compartment 11, the channel member 52 is folded on the pivot pin 53 through an angular movement until it is in a position as shown by phantom lines 54 where it is coincident with the channel 49. In this position, it is out of the way and serves no particular function. Of course, the channel member 52 can be used as an extension in other situations where it is desired to guide the material to a more distant location than when only the channel 47 is used.

The horizontal auger 24 is provided at its exhaust end with a straight blade 24a which is an extension of the auger's helical blade. This blade 24a is used to maintain a flow of grain from the horizontal auger 24 to the lower end of the vertical auger 32. Likewise, the vertical auger 32 is provided at its upper or exhaust end with a straight blade 32a. In this case, the blade 32a acts to properly throw or expel the grain through the opening 40.

As indicated in FIGS. 2, 4, 5, 7 and 8, the support members 15 and 16 are provided at their upper forward ends with a channel member 55 which laterally bridges the frame members 15 and 16. The vertical auger tube 29 is positioned in a space provided between the channel member 55 and the end walls 3 and 7 of the receptacle 1. The upper surface of the channel member 55 is provided with an angle bar 56 which is provided at its rear edge with notches 57. These notches are used to engage a plate 60 secured to the wall of the auger tube 29. The angle bar 56 is held in position on the channel member 55 by means of two screws 58. These screws 58 project well above the surface of the angle member 56 and are each provided with an encircling compression spring 59 which reacts against the head of the screw and the angle member 56 to hold the angle member 56 downwardly against the channel member 55. The holes in the angle bar 56, through which the screws 58 are passed, are of a larger size than the diameter of the screws to permit the angle bar 56 to be moved against the pressure of the springs so that the notches 57 are out of the path of the plate 60. When the angle bar 56 is in its moved position, the auger tube 29 can be moved angularly on the retaining ring 31 between positions to either side of the auger box where it may contact the upper surface of the frame members 15 or 16. Also, the auger tube 29 can be rotated to intermediate positions where the plate 60 engages one of the notches 57 to keep the auger tube positioned.

As best shown in FIGS. 5, 6, and 7, there is provided a valve 61 consisting of two inverted V-shaped channels 62 and 63. Channel 62 is provided with tabs 64 at its ends which extend upwardly and are fastened in a fixed position by means of screws to the end walls 6 and 14 of the receptacle 1. The edges of the channel 62 contact the inside surfaces of the walls 8 and 14 of the receptacle 1 to provide a space 65 bounded between channel 62 and the walls 8, 14, and 25 of the receptacle 1, through which the horizontal auger 24 is passed. The other channel 63 of the valve 61 is positioned immediately below the channel 62 in the space 65 above the auger 24 and its edges rest on the walls 8 and 14. It is provided with two depending lugs 66 which retain the inner end of a T-shaped handle 67 used to slide the channel 63 longitudinally of the channel 62. Both of the channels 62 and 63 are provided with rectangular notches 68 along both of the lateral margins to provide both channels with spaced laterally extending rectangular tongues 69. By proper longitudinal positioning of the channel 63 by means of the valve rod 67, it is possible to overlap the tongues 69 of the channels 62 and 63 by varying amounts in order to provide openings 70 of varying sizes between the channels 62 and 63. The widths of the tongues 69 on the channel 63 are greater than those on the channel 62 so that when the channel 63 is moved all the way to the left as viewed in FIG. 5, the openings 70 are entirely closed, the extra width of the tongues 69 on the channel 63 providing an overlap with the channel 62 which guarantees this. Instead of having the tongues of the channel 63 wider, the same result can be achieved by having the tongues on the channel 62 wider. Thus, it can be seen that when the compartment 10 is filled with grain or other material, it is free to flow through the openings 70 and down into the helical blade of the horizontal auger 24. Naturally, when the valve is adjusted so that the openings 70 are closed, there can be no flow of material from the compartment 10 directly to the horizontal auger 24.

The other compartment 11 of the receptacle 1 is not shown provided with any valve so that when grain or material is placed in the compartment 11, it flows directly to the horizontal auger 24. Although no valve is shown, as an alternate construction, a valve similar to 61 could be positioned in this compartment in order to provide a metered flow of grain or material to the auger 24 from that compartment.

In order to provide continuous movement of the grain or other material within the compartments 10 and 11, and to prevent caking of the material, two feeders 71 and 72 are provided along with these agitators 73, 74 and 75. These feeders and agitators consist of flat blades extending at right angles to each other mounted on shafts 76, 77, 78, 79 and 80 respectively. These shafts are journaled at their midpoints in bearings in the wall 14, while at their ends they are journaled in bearings in walls 6 and 7. The flat blades of the feeders 71 and 72 and agitators 73 are rectangular in shape while those of the agitators 74 and 75 are provided with spaced triangular projections 81. As shown in FIG. 6, arrows indicate the direction of rotation of the feeders and agitators. Although it is common for auger boxes to use agitators, the use of feeders like 71 and 72 which feed the grain directly into the valve 61 permit the auger box to be used for poultry or cattle feed and other materials which, because of its non-flowing characteristics due to moisture or other reasons prevents proper feeding.

In order to drive all of the parts of the auger box simultaneously, drive shaft 82 is provided at the front end of the unit. The front end 83 of this drive shaft is designed to couple in a conventional manner to a tractor or other vehicle used to pull the auger box. The rear end 84 of the drive shaft is coupled to the front end of the shaft 85 of the horizontal auger 24. The rear end of the shaft 85 is provided with a pinion 86 which drives sprocket 87 by means of a chain 88. The sprocket 87 is fixed to the end of the shaft 78 of the agitator 73 and it causes rotation of the agitator 73. Also attached to the end of the shaft 78 is a pinion gear 89 which in turn engages and drives spur gear 90 mounted on the shaft 76 of the feeder 71 to cause rotation of the feeder 71. Also at the end of the shaft 76 is a sprocket 91 which drives another sprocket 92 by means of a chain 93. The sprocket 92 is fastened to the end of the shaft 79 and causes rotation of the agitator 74. The spur gear 90 is meshed with an adjacent spur gear 94 which is fastened to the end of the shaft 77 to cause rotation of the feeder 72. The end of the shaft 77 is also provided with a sprocket 95 for driving another sprocket 96 by means of a chain 97. The sprocket 96 is mounted at the end of the shaft 80 and causes rotation of the agitator 75. Thus, mechanism is provided for driving all of the agitators and feeders directly from the horizontal auger drive. In addition, as already explained, the vertical auger 32 is also driven by means of a take-off from the horizontal auger 24.

There are several ways in which the auger box of this invention can be used, depending upon the requirements of the user of the auger box. However, the following are three examples of methods for its operation.

The first is to use the auger box in the conventional manner for distributing layers of feed, fertilizer or other materials from a single compartment which, in this case, can be from either of the compartments 10 or 11. Assuming that compartment 11 is filled with layers of different grains one upon the other, upon operation of the augers, mixers and feeders, the grain drops down and fills up the horizontal auger 24 which, in turn, supplies grain to the vertical auger 32. The vertical auger 32 raises the grain through the auger tube 29 and causes it to be expelled through the opening 40 and out through the guides 47 and 49. With the guides 47 and 49 directed toward feed bins or other places where the grain is to be fed, the grain can be distributed until the compartment 11 is emptied. Because the horizontal auger 24 fills up first from the left, as viewed in FIG. 5, the layers of grain soon acquire slopes as indicated by phantom lines 98 which extend downwardly toward the rear of the compartment 11. As the grain recedes, some grain from each of the layers falls into the auger simultaneously. Although some mixing can be accomplished in this manner, the degree of mixing at best seems to be rather coarse and disproportionate.

The second manner of using the auger box is to close the valve 61 to prevent any passage of grain through the valve to the horizontal auger 24. At the same time, layers of the grain or other material to be mixed are poured into the compartment 11. The auxiliary channel 52 is then positioned as shown in FIG. 5 where it directs the feed expelled from opening 40 into the compartment 10. Then the parts of the auger box are operated to start circulation of the grains. The grain is removed by the horizontal auger 24 from the compartment 11 and fed into compartment 10. At that time, coarse mixing of the material or grain corresponding to the mixing of grain in the conventional box is achieved. Next, the valve 61 is opened and the auxiliary guide channel 52 is folded to the position 54 so that grain expelled from the opening 40 is guided down into the compartment 11. Operation of the parts of the auger box is begun with the result that the grain is removed from compartment 10 and reloaded into compartment 11. At this point, there has been a double circulation of the grain to provide proportionately twice as much mixing as with the conventional single compartment type auger box. If further mixing is required, the same cycle of operations can be repeated by alternately opening and closing the valve 61 for alternate operation of the auger box. This recirculation and mixing can be continued until the grain is mixed or blended to the degree of homogeneity required. Thus, a result which has never been achieved with an auger box before is accomplished by a combination of the multicompartment box with the valve.

The third basic way to use the auger is as a proportionate mixer. Both compartments 10 and 11 are filled with different materials to be mixed together in a certain proportion of one to the other. The valve 61 is then opened to an extent necessary to provide the proper proportion of the material in compartment 10 to that which is to be supplied from compartment 11. For example, if the materials are to be mixed in the ratio of one part to two parts, the valve 61 is adjusted to permit the horizontal auger 24 to be filled one-third with the material from compartment 10. When the material traveling through the auger reaches the vicinity of compartment 11, it then fills up the remaining two-thirds with the material from compartment 11. The result is that the mixed material expelled from the opening 40 is in the ratio of one part from compartment 10 to two parts from compartment 11. In this case, the material is not recirculated into the auger box, but instead is distributed to feed boxes or other places of use. Of course, the resulting proportionate mix from compartment 10 and 11 can be redumped into either of the compartments 10 or 11 after the proper mixing is completed and that mix blended in a certain proportion with another material which can be placed in the empty compartment.

The preferred embodiment of the invention is shown and described with the receptacle 1 comprising two compartments 10 and 11 and a valve 61 in only one compartment 10. As mentioned, it is believed that a similar valve placed in compartment 11 would increase the versatility of the unit by reducing the overall amount of grain or material supplied to the augers for distribution while still controlling the flow of proportionate amounts from each of the compartments 10 and 11 to the augers. Also, the main receptacle can be divided into three or more compartments to increase its versatility. In any case, the important features are the use of a valve in at least one compartment and the use of more than one compartment. It should be further understood, though, that even the use of a single compartmented auger box with a valve such as 61 will have an advantage over the conventional auger box because it permits the rate of material being fed to be regulated.

From this description it should be apparent that an improved auger box has been invented which, not only has all of the advantages of the ordinary auger box, but embodies many other features which increase its versatility and extend its use to mixing and blending of grains or other materials generally or in accurate proportionate ratios without requiring the use of additional mixing or blending equipment.

Although one embodiment of the invention has been shown and described, it should be understood that the invention can be made in other ways without departing from the scope of the appended claims.

We claim:

1. An auger box comprising a receptacle for containing granular material, an auger positioned within the receptacle for receiving the granular material from the receptacle and adapted to be rotated for transporting the granular material toward one end of the receptacle, an upwardly extending auger tube journalled at the front end of the receptacle with an opening extending between the receptacle and the lower end of the auger tube to provide passage of granular material from the auger to the auger tube, a second auger journalled in the auger tube and adapted upon rotation to transport granular material supplied from the first auger upwardly through the auger tube, said auger tube having a projection engageable with one of a plurality of slots provided on a bar mounted on the frame of the receptacle, the mounting of said bar to the frame comprising a stud in a hole connection wherein clearance is provided between the stud and the hole, said clearance being sufficient to permit angular movement of the bar relative to the frame and clear of the path of the projection on the auger tube to permit angular positioning of the auger tube, resilient means mounted between the bar and the frame to ordinarily urge interference of the bar with the auger tube to thereby maintain a particular angular position of the auger tube when one of said slots is aligned with said projection.

2. An auger box comprising a receptacle for containing granular material, an auger positioned within the receptacle for receiving the granular material from the receptacle and adapted to be rotated for transporting the granular material toward one end of the receptacle, an upwardly extending auger tube journalled at the front end of the receptacle with an opening extending between the receptacle and the lower end of the auger tube to provide passage of granular material from the auger to the auger tube, a second auger journalled in the auger tube and adapted upon rotation to transport granular material supplied from the first auger upwardly through the auger tube, said auger tube having a projection engageable with one of a plurality of slots provided on a bar mounted on the frame of the receptacle, said bar being provided with holes for mounting the bar on studs secured to said frame, resilient means reacting between portions of the studs and the bar to ordinarily urge the bar into engagement with said auger tube and thereby provide a temporarily fixed angular position of the auger tube when one of said slots is aligned with said projection, said holes in the bar being larger than the cross-sectional area of the studs by an amount sufficient to permit the bar to be displaced angularly against said resilient means and out of the path of said auger tube to permit angular repositioning of the auger tube.

3. An auger box comprising a receptacle divided into a plurality of contiguous compartments for containing granular material, one compartment being positioned ahead of the other to provide a rear compartment and at least one front compartment, the side walls of the receptacle being sloped to converge toward its bottom wall, a generally horizontal auger positioned between said side walls adjacent said bottom wall and extending through all of the compartments and journalled for rotation to transport granular material received from the compartments toward the front of the receptacle, the rear compartment being provided with a valve for regulating the flow of granular material from said rear compartment to the auger to cause the portion of the auger adjacent the rear compartment to be partially filled with granular material, and the front compartment being without a valve to provide full flow of granular material from the front compartment to the auger and thereby cause the partially filled auger to be entirely filled adjacent the front compartment, an upwardly extending auger tube connected at the front end of the receptacle with an opening extending between the receptacle and the lower end of the auger tube to provide passage of granular material from the horizontal auger to the auger tube, a second auger journalled in the auger tube and adapted upon rotation to transport granular material supplied from the horizontal auger upwardly through the auger tube, said auger tube having a projection engageable with one of a plurality of slots provided on a bar mounted on the frame of the receptacle, the mounting of said bar to the frame comprising a stud in a hole connection wherein clearance is provided between the stud and the hole, said clearance being sufficient to permit angular movement of the bar relative to the frame and clear of the path of the projection on the auger tube to permit angular positioning of the auger tube, resilient means mounted between the bar and the frame to ordinarily urge interference of the bar with the auger tube to thereby maintain a particular angular position of the auger tube when one of said slots is aligned with said projection.

4. An auger box comprising a receptacle divided into a plurality of contiguous compartments for containing granular material, one compartment being positioned ahead of the other to provide a rear compartment and at least one front compartment, the side walls of the receptacle being sloped to converge toward its bottom wall, a generally horizontal auger positioned between said side walls adjacent said bottom wall and extending through all of the compartments and journalled for rotation to transport granular material received from the compartments toward the front of the receptacle, the rear compartment being provided with a valve for regulating the flow of granular material from said rear compartment to the auger to cause the portion of the auger adjacent the rear compartment to be partially filled with granular material, and the front compartment being without a valve to provide full flow of granular material from the front compartment to the auger and thereby cause the partially filled auger to be entirely filled adjacent the front compartment, an upwardly extending auger tube connected at the front end of the receptacle with an opening extending between the receptacle and the lower end of the auger tube to provide passage of granular material from the horizontal auger to the auger tube, a second auger journalled in the auger tube and adapted upon rotation to transport granular material supplied from the horizontal auger upwardly through the auger tube, said valve having two overlapping plates positioned one below the other and provided with spaced tongues which can be overlapped by different amounts, the upper plate being fixed relative to the receptacle and the lower plate being free to shift relative to the upper plate and provide different amounts of overlap of said tongues, the edges of said lower plate slidably resting on the downwardly convergent side walls of the compartment, said auger tube having a projection engageable with one of a plurality of slots provided on a bar mounted on the frame of the receptacle, the mounting of said bar to the frame comprising a stud in a hole connection wherein clearance is provided between the stud and the hole, said clearance being sufficient to permit angular movement of the bar relative to the frame and clear of the path of the projection on the auger tube to permit angular positioning of the auger tube, resilient means mounted between the bar and the frame to ordinarily urge interference of the bar with the auger tube to thereby maintain a particular angular position of the auger tube when one of said slots is aligned with said projection.

References Cited in the file of this patent

UNITED STATES PATENTS

| Number | Name | Date |
|---|---|---|
| 539,288 | McLennan | May 14, 1895 |
| 921,696 | Hart | May 18, 1909 |
| 1,177,666 | Wayling | Apr. 4, 1916 |
| 1,727,992 | King | Sept. 10, 1929 |
| 2,412,121 | Bradshaw | Dec. 3, 1946 |
| 2,438,301 | Schulte | Mar. 23, 1948 |
| 2,447,202 | Nowery | Aug. 17, 1948 |
| 2,613,799 | Bawden et al. | Oct. 14, 1952 |
| 2,631,760 | Hoppes | Mar. 17, 1953 |
| 2,630,945 | Gandrud | Mar. 10, 1953 |
| 2,673,741 | Durand | Mar. 30, 1954 |
| 2,731,248 | Fisher | Jan. 17, 1956 |
| 2,743,832 | Kappelmann | May 1, 1956 |
| 2,767,963 | Ringen et al. | Oct. 23, 1956 |
| 2,778,535 | Seltzer | Jan. 22, 1957 |